W. SCHOTT.
LOCK FOR MACHINE SCREWS.
APPLICATION FILED JAN. 2, 1909.
920,399.
Patented May 4, 1909.
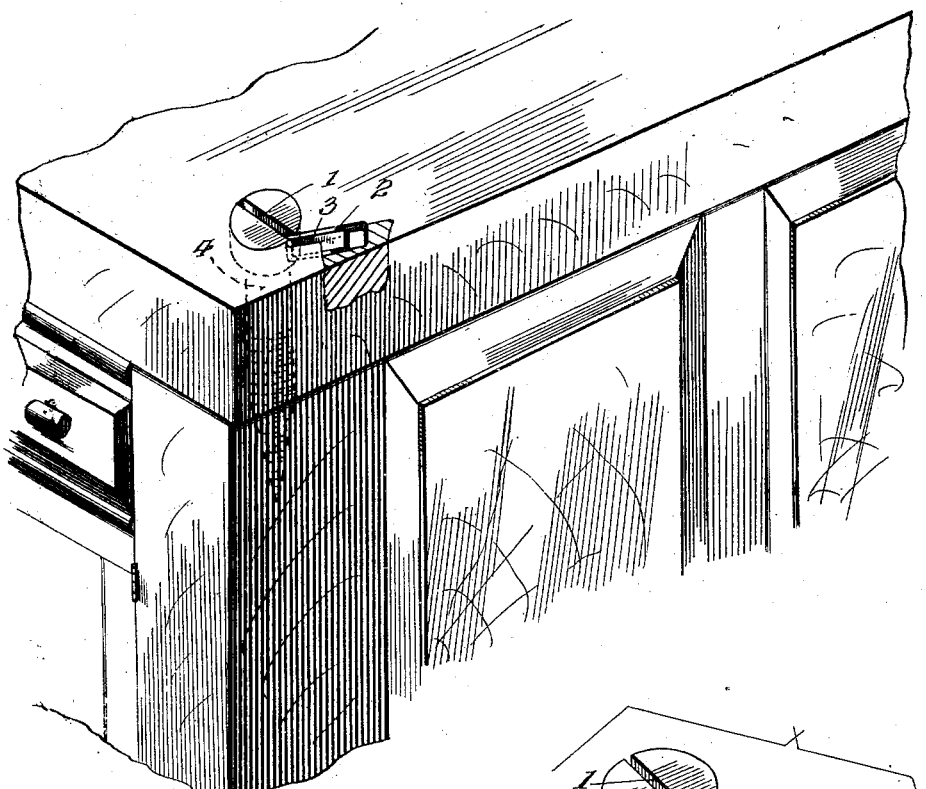
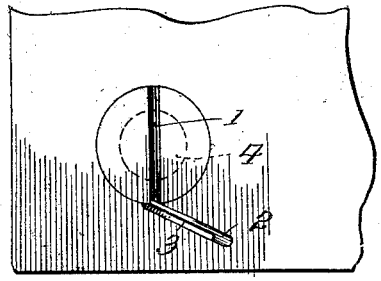
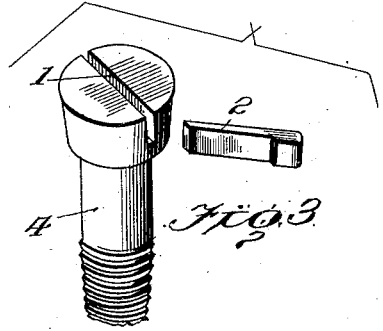
Witnesses
Inventor
W. Schott.
By ........., Attorneys

UNITED STATES PATENT OFFICE.

WILLIAM SCHOTT, OF ST. LOUIS, MISSOURI.

LOCK FOR MACHINE-SCREWS.

No. 920,399.　　　　Specification of Letters Patent.　　　　Patented May 4, 1909.

Application filed January 2, 1909. Serial No. 470,464.

*To all whom it may concern:*

Be it known that I, WILLIAM SCHOTT, citizen of the United States, residing at St. Louis, State of Missouri, have invented certain new and useful Improvements in Locks for Machine-Screws, of which the following is a specification.

The purpose of this invention is to prevent the loosening of wood screws, the same being of advantage in bridge building and other structures formed of wooden timbers and united by means of lag or wood screws.

In accordance with this invention a lock is provided and arranged to coöperate with the usual wood screw to form positive securing means therefor against backward rotation, said lock consisting of a substantially flat spring having an approximate tangential arrangement to the head of the screw and located so as to engage the slot formed in said head to receive the screw driver, said spring being arranged in a groove formed in the material at one side of the opening in which the screw is fitted.

For a full understanding of the invention and the merits thereof and also to acquire a knowledge of the details of construction and the means for effecting the result, reference is to be had to the following description and accompanying drawings, in which:

Figure 1 is a perspective view showing the application of the invention; Fig. 2 is a plan or end view; and, Fig. 3 is a detail view.

Corresponding and like parts are referred to in the following description and indicated in all the views of the drawings by the same reference characters.

The screw illustrated is of ordinary form commonly provided for joining parts to be connected and is supplied in its head with the usual transverse slot 1 to receive the screw driver. In accordance with this invention a lock 2 is provided, the same consisting of a substantially flat spring arranged in a groove or channel 3 provided in the work or material at one side of the opening through which the screw 4 is passed when in position. The flat spring 2 is provided with a beveled extremity for engagement with the head of the screw at the end of the slot 1 formed therein. The groove or channel 3 has a substantially tangential arrangement with reference to the head or body of the screw, so that the adjacent end of the lock 2 may engage with one side of the slot 1 and thereby prevent backward rotation or loosening of the screw.

The tangential arrangement of the lock 2 admits of the forward rotation of the screw when driving the same home. The groove or channel 3 may be provided in any manner and is of such size as to retain the lock spring 2 in place and yet admit of the end portion of the lock adjacent to the screw having a limited movement, so as to clear the screw and yet react and engage with a side of the slot 1, so as to secure the screw against backward movement.

It will be understood from the foregoing that the invention provides simple and effective means for securing wood screws of ordinary construction without necessitating any change or modification in their formation, hence the invention may be readily applied to wood screws as commonly manufactured and in general use. The groove or channel 3 may be formed in any manner so as to provide a seat in which the lock 2 is fitted. The approximate tangential arrangement of the spring is necessary to permit the forward rotation of the screw and yet secure the same from loosening.

While the invention is described in connection with a wood screw it is not to be restricted in its use and may be applied to machine screws or analogous fastenings having slotted heads, so as to secure the same from turning backward after being tightened.

Having thus described the invention what is claimed as new is:

In a screw lock as specified, the combination of a screw having a slot formed in the head thereof, said screw positioned through a piece of work, of a flat spring being arranged edge-wise in the work in tangential relation to the head of said screw, said spring being enlarged at its inner end to form an abutment to hold the same firmly in the work, the slot in the work for the reception of said spring being of uniform width throughout to admit of the vibration of the forward end of said spring when said screw is rotated forwardly, and having a beveled outer end to engage one wall of the slot in the head of said screw to prevent the backward rotation of the same.

In testimony whereof I affix my signature in presence of two witnesses.

WILLIAM SCHOTT. [L. S.]

Witnesses:
　JOSEPH LAMMERT,
　JAMES MAHONY.